United States Patent [19]

Kinugasa et al.

[11] Patent Number: 5,231,509
[45] Date of Patent: Jul. 27, 1993

[54] BURST GATE PULSE GENERATING DEVICE FOR USE IN IMAGE SIGNAL REPRODUCING SYSTEM

[75] Inventors: Norihide Kinugasa, Itami; Yoshimitsu Saka, Osaka; Koichi Yoshimura, Kyoto; Narutoshi Kanazawa, Osaka, all of Japan

[73] Assignee: Matsushita Electric Industrial Co., Ltd., Osaka, Japan

[21] Appl. No.: 610,192

[22] Filed: Nov. 5, 1990

[30] Foreign Application Priority Data

Nov. 27, 1989 [JP] Japan .................................. 1-307007
Jan. 19, 1990 [JP] Japan ...................................... 2-9915

[51] Int. Cl.[5] .......................................... H04N 9/455
[52] U.S. Cl. .................................... 358/326; 358/323; 358/19; 358/20
[58] Field of Search ................ 358/335, 320, 323, 326, 358/337, 310, 19, 20, 17, 148, 153, 150; 360/27, 33.1, 36.1

[56] References Cited

U.S. PATENT DOCUMENTS

| | | | |
|---|---|---|---|
| 4,422,103 | 12/1983 | Kanamaru | 358/326 |
| 4,613,827 | 9/1986 | Takamori et al. | 358/326 |
| 5,025,316 | 6/1991 | Darby | 358/167 |
| 5,038,203 | 8/1991 | Hagino et al. | 358/20 |

Primary Examiner—Tommy Chin
Assistant Examiner—Huy Nguyen
Attorney, Agent, or Firm—Lowe, Price, LeBlanc & Becker

[57] ABSTRACT

A signal processing apparatus for use in a video cassette recorder comprising a pilot burst gate pulse generating system means responsive to horizontal synchronizing signals successively generated in correspondance with horizontal scanning periods to process the horizontal synchronizing signals so as to produce pilot burst gate pulses. The pilot burst gate pulse generating system is responsive to a first horizontal synchronizing signal to generate the pilot burst gate pulse at a timing delayed by a predetemined time period from a leading edge of a second horizontal synchronizing signal following the first horizontal synchronizing signal. This arrangement allows stable generation of the pilot burst gate pulse at a timing slightly delayed from the active edge of the corresponding horizontal synchronizing signal.

8 Claims, 8 Drawing Sheets

BURST GATE PULSE GENERATING DEVICE FOR USE IN IMAGE SIGNAL REPRODUCING SYSTEM

BACKGROUND OF THE INVENTION

The present invention generally relates to a signal processing apparatus for video cassette recorders (VCR), and more particularly to a pilot burst gate pulse generating system suitable for extracting a pilot burst signal from a composite video signal based upon the S-VHS standard of the PAL system.

In a composite video signal based upon the VHS standard of the PAL system, there are included a burst signal having a duration (width) of 4 μsec which is introduced thereinto at a timing elapsed by 4 μsec from the active edge of a horizontal synchronizing signal and further included a video signal which is introduced thereinto at a timing delayed by a predetermined time period from the burst signal. On the other hand, in a composite video signal based upon the S-VHS standard of the PAL system, there are included a pilot burst signal having a duration of 2.4 μsec which is introduced thereinto at a timing elapsed by 0.8 μsec from the active edge of a horizontal synchronizing signal and further included the same burst signal and video signal as in the aforementioned VHS standard which are introduced thereinto at a timing after the introduction of the pilot burst signal. In reproducing the video signal from the composite video signal satisfying the S-VHS standard, it is required to produce a pilot burst gate pulse signal on the basis of the horizontal synchronizing signal so as to extract the pilot burst signal by the produced pilot burst gate pulse signal.

FIG. 1 is a block diagram showing a prior art pilot burst gate pulse generating system and FIG. 2 is a timing chart showing voltage waveforms at portions of the pilot burst gate pulse generating system as shown in FIG. 1. In FIGS. 1 and 2, the generating system is provided with a first input terminal 1 responsive to a clock signal and further equipped with a second input terminal 2 responsive to a horizontal synchronizing signal (HSS) of a television signal. The second input terminal 2 is coupled to a reset pulse generating circuit 3 which is triggered in response to the active edge of the inputted horizontal synchronizing signal so as to generate reset pulses 3a having a duration corresponding to one or two clock pulse repetition periods. The reset pulse 3a is supplied to the reset terminal of a counter 4 which in turn enters into a reset condition. The counter 4 is also coupled to the first input terminal 1 to start its counting operation in response to the clock signal after being reset by the resent pulse 3a. The repetitive counting operation of the counter 4 is illustrated in analog form at 4a in FIG. 2. When the count value reaches a first value A, the counter 4 generates a first pulse through an output terminal A, and when reaching a second value B, it generates a second pulse through an output terminal B. These first and second pulses are supplied through inverters 5 and 6 to first and second latch circuits 7 and 8, respectively. The first latch circuit 7 is composed of NAND gates 9 and 10 which are cross-coupled to each other and the second latch circuit 8 is similarly composed of NAND gates 11 and 12 which are cross-coupled to each other. One input terminals of the first and second latch circuits 7 and 8 are responsive to the output pulses of the inverters 5 and 6, respectively, and the other terminals thereof are responsive to the reset pulse 3a from the reset pulse generating circuit 3. The output pulse of the second latch circuit 8 is supplied to an inverter 13 so as to be inverted to a pulse as illustrated at 13a in FIG. 2 and then supplied to one input terminal of an AND gate 14. The output pulse of the first latch circuit 7, as illustrated at 7a in FIG. 2, is led to the other input terminal of the AND gate 14, thereby obtaining a pilot burst gate pulse 15a as illustrated at 15a in FIG. 2.

There is a problem with arises with such a conventional pilot burst gate pulse generating system, however, in that extreme difficulty is encountered to generate a pilot burst gate pulse slightly delayed from the leading (rising) edge of the horizontal synchronizing signal (HSS) supplied to the second input terminal 2 (in the above-mentioned S-VHS standard, 0.8 μsec +0.3 μsec), because of resulting in a delay of approximately 0.8 μsec when separating the horizontal synchronizing signal from the composite synchronizing signal of the television signal. Thus, it is impossible to generate a pilot burst gate pulse at a timing delayed by 0.8 μsec with respect to the rising edge of the horizontal synchronizing signal before the synchronous separation.

SUMMARY OF THE INVENTION

It is therefore an object of the present invention to provide a pilot burst gate pulse generating system which is capable of accurately and surely generating a pilot burst gate pulse at an adequate timing, i.e., a timing slightly delayed from the leading (rising) edge of the aiming horizontal synchronizing signal.

Another object of this invention is to reduce the circuit scale of such a pilot burst gate pulse generating system so as to be suitable for fabricating it into a semiconductor substrate as an integrated circuit.

With these and other features which will become apparent as the description proceeds, a pilot burst gate pulse generating system according to the present invention, being a signal processing system for a video cassette recorder, comprises means for inputting horizontal synchronizing signals successively generated in correspondance with horizontal scanning periods so as to process the horizontal synchronizing signals for producing pilot burst gate pulses. The pilot burst gate pulse generating system is arranged to be responsive to a first horizontal synchronizing signal to generate the pilot burst gate pulse at a timing delayed by a predetemined time period from a leading edge of a second horizontal synchronizing signal following the first horizontal synchronizing signal.

Preferably, the pilot burst gate pulse generating system includes first and second counter means arranged to start counting operations with a period corresponding to two times of the horizontal scanning period so as to alternately generate predetermined pulse signals when reaching predetermined count values, reset means for alternately resetting the first and second counter means in synchronism with the horizontal synchronizing signals, and means responsive to the predetermined pulse signals from the first and second counter means so as to generate the pilot burst gate pulses.

Further, it is appropriate that the pilot burst gate pulse generating system includes first counter means arranged to start counting operation having count periods each corresponding to one horizontal scanning period so as to generate a first count signal when reaching a first cunt value in a first count period and further generate a second count signal when reaching a second count value in a second count period, second counter means arranged to start counting operation in response to the first count signal from the first counter means and to stop the counting operation in response to the second count signal therefrom and continue to stop the counting operation until the first counter means generates the next first count signal in response to reaching the next first count value in the second count period, and means coupled to the second counter means so as to generate a pilot burst gate pulse in accordance with count signals generated by the second counter means when the second counter means counts third and fourth values in each count period.

It is also appropriate that the pilot burst gate pulse generating system includes first means for generating, in response to the horizontal synchronizing signal, a pulse whose duration is shorter than one horizontal scanning period, counter means coupled to the first means to be reset in response to a trailing edge of the pulse from the first means and starting counting operation with a count period corresponding to one horizontal period, and second means coupled to the counter means for generating a pilot burst gate pulse in accordance with count signals generated by the counter means when reaching predetermined count values at every count period.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 3:
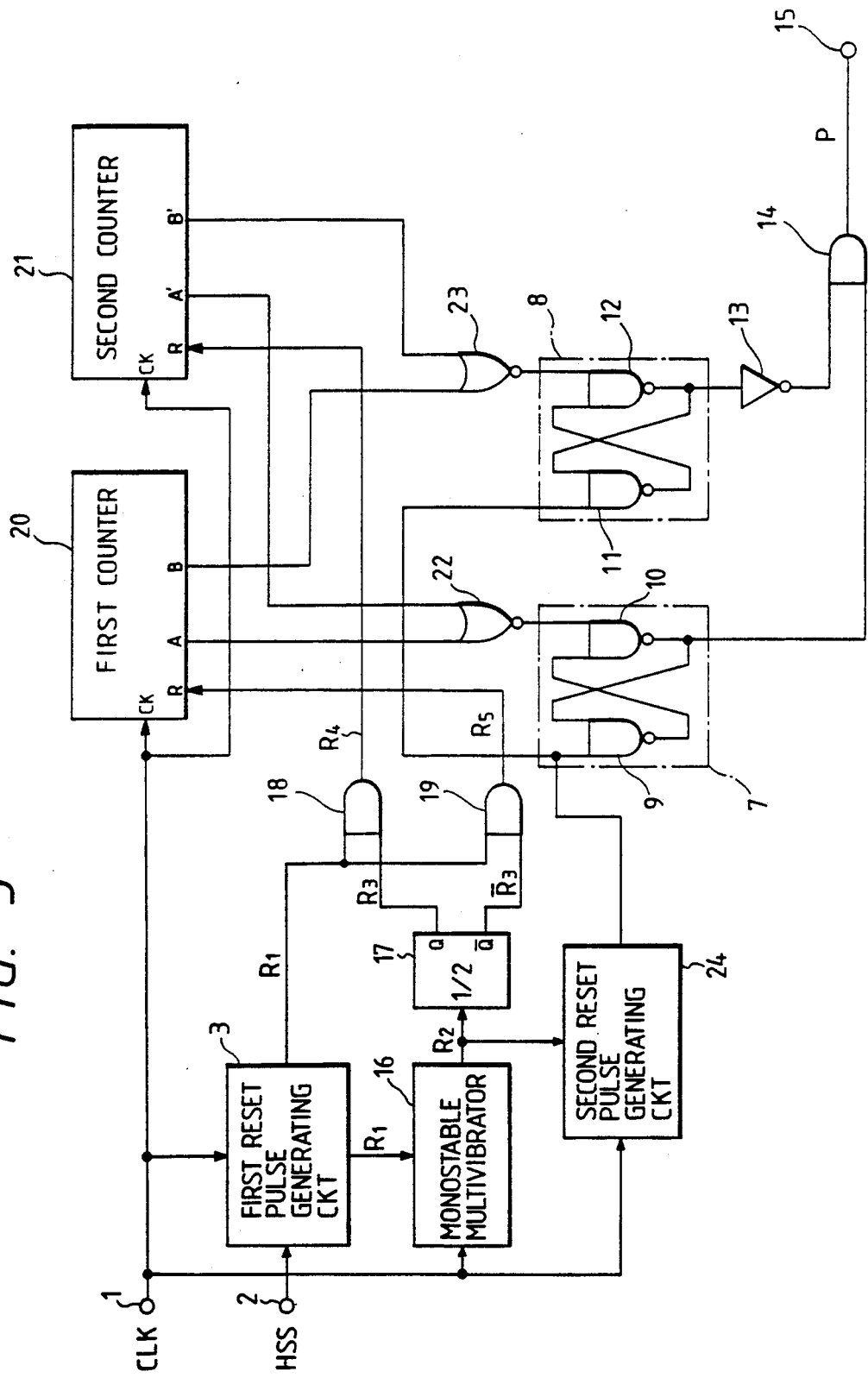
FIG. 3 is a block diagram showing a circuit arrangement of a pilot burst gate pulse generating system according to a first embodiment of the present invention.

Referring now to FIG. 3, there is illustrated a pilot burst gate pulse generating system according to a first embodiment of the present invention. The generating system will be described hereinbelow with reference to FIG. 4 in addition to FIG. 3. In FIG. 3, the generating system includes a first input terminal 1 for inputting a clock signal illustrated at CLK and further includes a second input terminal 2 for inputting a horizontal synchronizing signal of a composite synchronizing signal illustrated at HSS in FIG. 4. Also included in the generating system is a first reset pulse generating circuit 3 coupled to the clock signal CLK from the first input terminal 1 and responsive to the horizontal synchronizing signal HSS. The first reset pulse generating circuit 3 is triggered in response to the active edge (leading or rising edge) of the horizontal synchronizing signal HSS to generate reset pulse R1 each having duration corresponding to one or two repetition periods of the clock signal CLK, the reset pulse R1 being supplied to a digital monostable multivibrator 16 which acts as a counter and which is coupled to the clock signal CLK from the first input terminal 1. The digital monostable multivibrator 16 is triggered by the reset pulse R1 from the first reset pulse generating circuit 3, and generates, in response to the clock signal CLK, pulses R2 each having a duration shorter than the period of the horizontal synchronizing signals HSS. The pulse R2 from the digital monostable multivirator 16 is led to a ½ divider 17 and further to a second reset pulse generating circuit 24 which will be described hereinafter. The ½ divider 17 is triggered in response to the trailing (falling) edge of each of the pulses R2 from the digital monostable multivibrator 16 so as to generate, through one output terminal Q, pulses R3 produced by ½-dividing the pulses R2 and generate, through the other output terminal $\overline{Q}$, an inversion of pulses R3 on pulses $\overline{R3}$ (not shown in FIG. 4).

Figure 4:
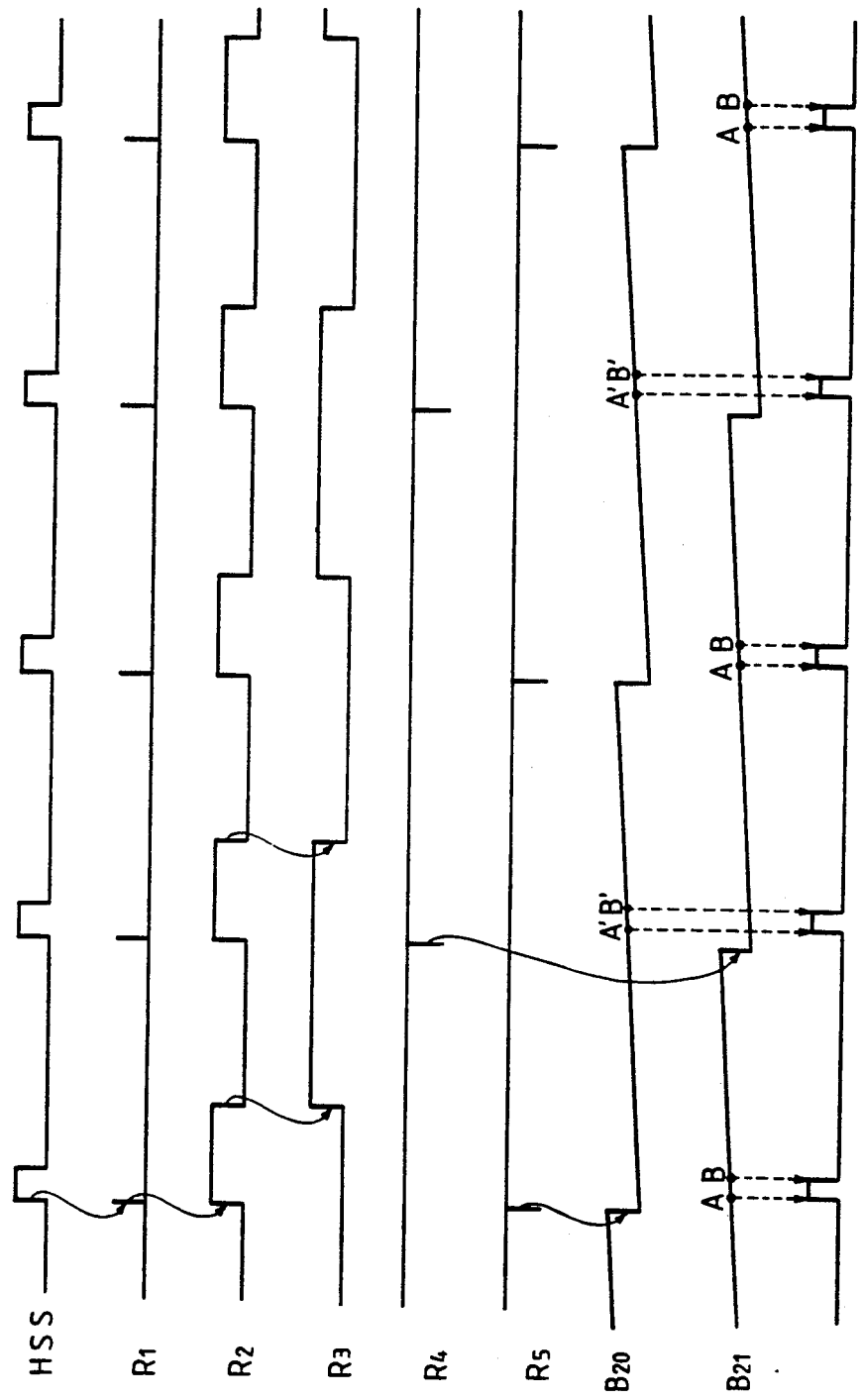
FIG. 4 is a timing chart showing waveforms at portions of the pilot burst gate pulse generating system shown in FIG. 3.

The output terminals Q and $\overline{Q}$ of the ½ divider 17 are respectively coupled to one input terminals of first and second AND gates 18 and 19 which in turn, are responsive to the pulses R3 and $\overline{R3}$, the other input terminals thereof being responsive to the reset pulse R1 from the first reset pulse generating circuit 3, whereby the first and second AND gates 18 and 19 output reset pulses R4 and R5, respectively, as illustrated in FIG. 4. Here, as obvious from FIG. 4, the reset pulses R4 and R5 are alternately generated in synchronism with the horizontal synchronizing signal HSS. The reset pulse R4 from the first AND gate 18 is led to a reset terminal $\overline{R}$ of a second counter 21 which is coupled through its input terminal CK to the clock signal CLK from the first input terminal 1 and on the other hand the reset pulse R5 from the second AND gate 19 is led to a reset terminal $\overline{R}$ of a first counter 20 which is also coupled through its input terminal CK to the clock signal CLK therefrom. The first and second counters 20 and 21 are respectively reset by the reset pulses R5 and R4 from the second and first AND gates 19 and 18 and then start the counting operations in accordance with the clock signal CLK from the first input terminal 1. In FIG. 4, B20 and B21 respectively show the repetitive counting operations of the first and second counters 20 and 21 in analog form.

Figure 1:
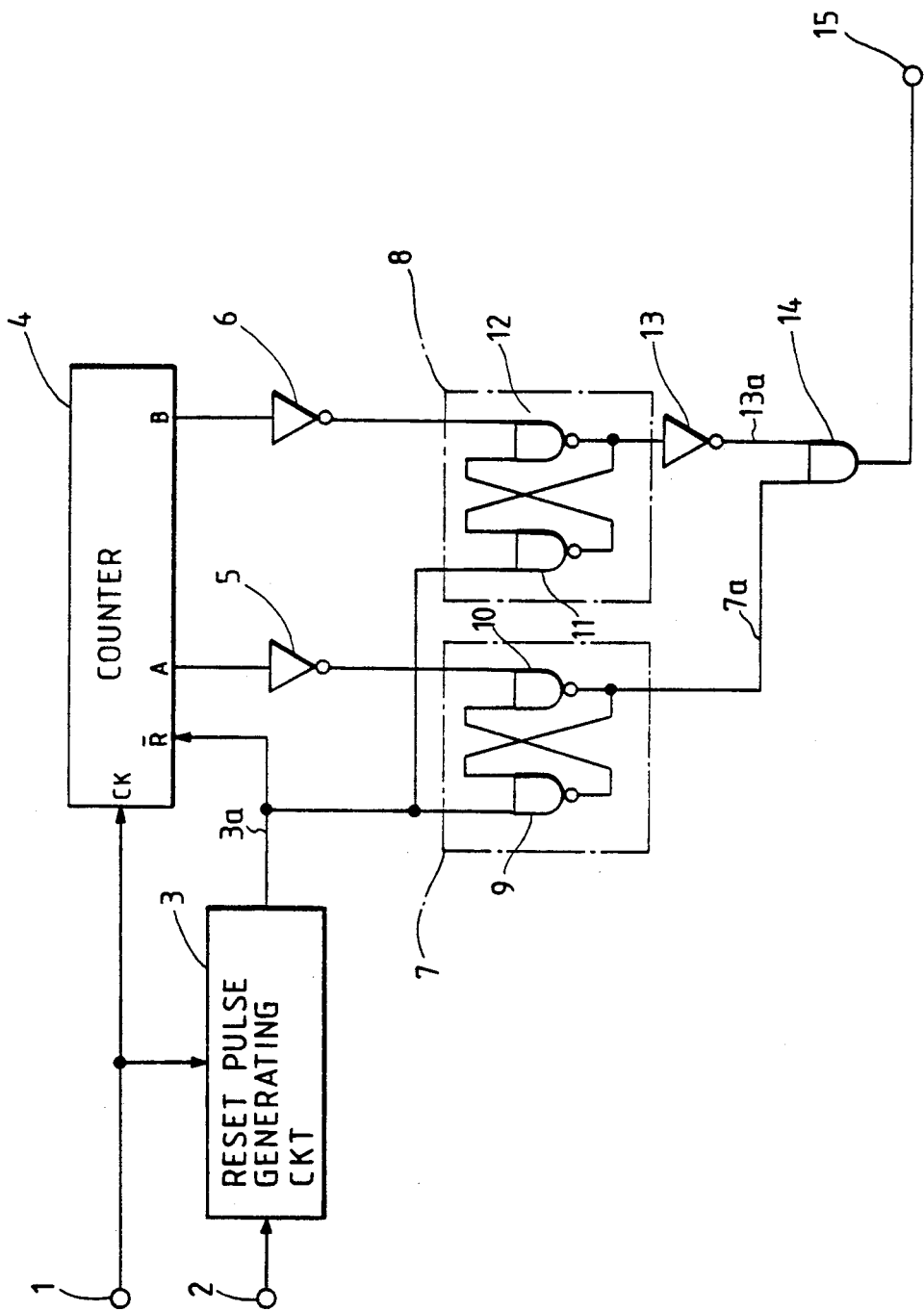
FIG. 1 is a block diagram showing a circuit arrangement of a conventional pilot burst gate pulse generating system.
Figure 2:
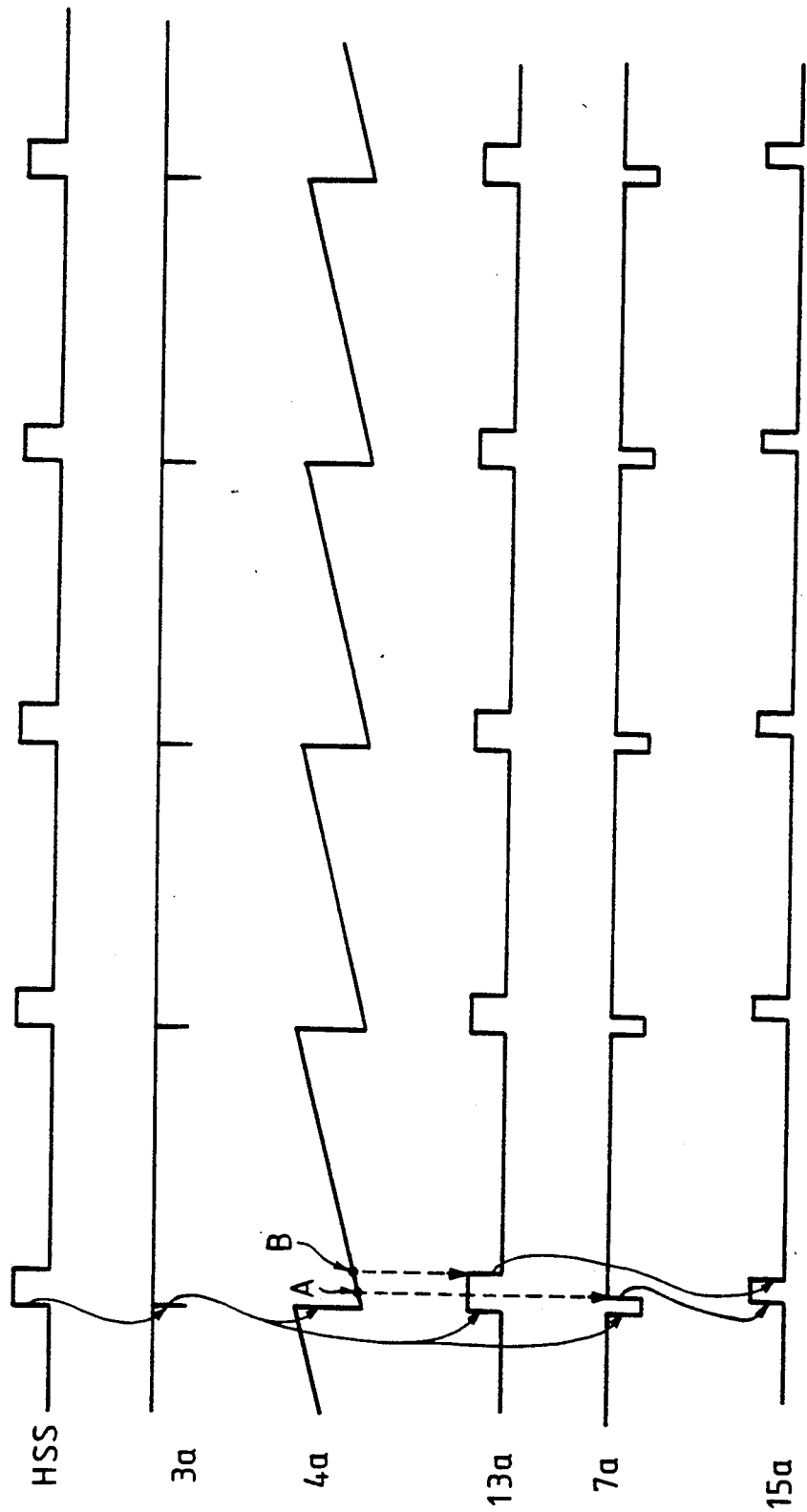
FIG. 2 is a timing chart showing waveforms at portions of the conventional pilot burst gate pulse generating system shown in FIG. 1.

When the count value of the first counter 20 reaches a first value A and then reaches a second value B, the first counter 20 generates pulses through terminals A and B. The pulse from the terminal A is supplied to one input terminal of a first NOR gate 22 and the pulse from the terminal B is supplied to one input terminal of a second NOR gate 23. On the other hand, when the count value of the second counter 21 reaches a value A' and then reaches a value B', the second counter 21 generates pulses through terminals A' and B'. The pulse from the terminal A' is inputted to the other input terminal of the first NOR gate 22 and the pulse from the terminal B' is inputted to the other input terminal of the second NOR gate 23. In response to the inputs, the first and second NOR gates 22 and 23 respectively output pulses which are in turn led to one input terminals of first and second latch circuits 7 and 8. As well as the first and second latch circuits (7, 8) of the conventional pilot burst gate pulse generating system illustrated in FIG. 1, the first latch circuit 7 is composed of two NAND gates 9 and 10 cross-coupled to each other and the second latch circuit 8 is composed of two NAND gates 11 and 12 cross-coupled to each other. To the other input terminals of these first and second latch circuits 7 and 8, the output pulse of the second reset pulse generating circuit 24 is supplied. The second reset pulse generating circuit 24 is triggered at a timing that the pulse R2 from the monostable multivibrator 16 returns to the low-level state and generates a reset pulse in accordance with the clock signal CLK from the first input terminal 1. In response to the reset pulse from the second reset pulse generating circuit 24, the first and second latch circuits 7 and 8 respectively enter into the reset states. The output pulse of the first latch circuit 7 is supplied to one input terminal of a third AND gate 14 and the output pulse of the second latch circuit 8 is inverted by means of an inverter 13 before being supplied to the other input terminal of the third AND gate 14. As a result, the third AND gate 14 outputs a pilot burst gate pulse P as illustrated in FIG. 4 to the output terminal 15. The pulse duration depending upon the count values A, B and A', B' of the above-mentioned first and second counters 20 and 21.

As obvious from the above description, the reset pulses R5 and R4 are arranged to be alternately generated in synchronism with the horizontal synchronizing signals HSS, and the first and second counters 20 and 21 are respectively reset in response to these reset pulses R5 and R4 so as to alternately perform the counting operations over two horizontal scanning periods, i.e., 2 H periods. Thus, if adequately determining the first and second count values A, B of the first counter 20 and the first and second count values A', B' of the second counter 21, a desirable pilot burst gate pulse P is obtainable through the output terminal, the pilot burst gate pulse P entering into the high-level state only during the time periods corresponding to the counting from the first count values A to the second count value B due to the first counter 20 and the counting from the first count value A' to the second count value B' due to the second counter 21. Here, the first and second counters 20 and 21 are respectively reset in response to the leading edge (active edge) of the horizontal synchronizing signal HSS previous to 1 H period and, at the same time, start the counting operations. Thus, the time interval from the timing that the first or second counter 20 or 21 is reset to the timing that the counting reaches the first and second count values A and B (or A' and B') becomes sufficiently long. That is, if the first and second counters 20 and 21 are set so that the count values reach the first count values A and A' when being elapsed by 0.8 μsec from the leading edge of the horizontal synchronizing signal HSS coming during the time interval, it is possible to generate a pilot burst gate pulse accurately satisfying the S-VHS standard.

Figure 5:
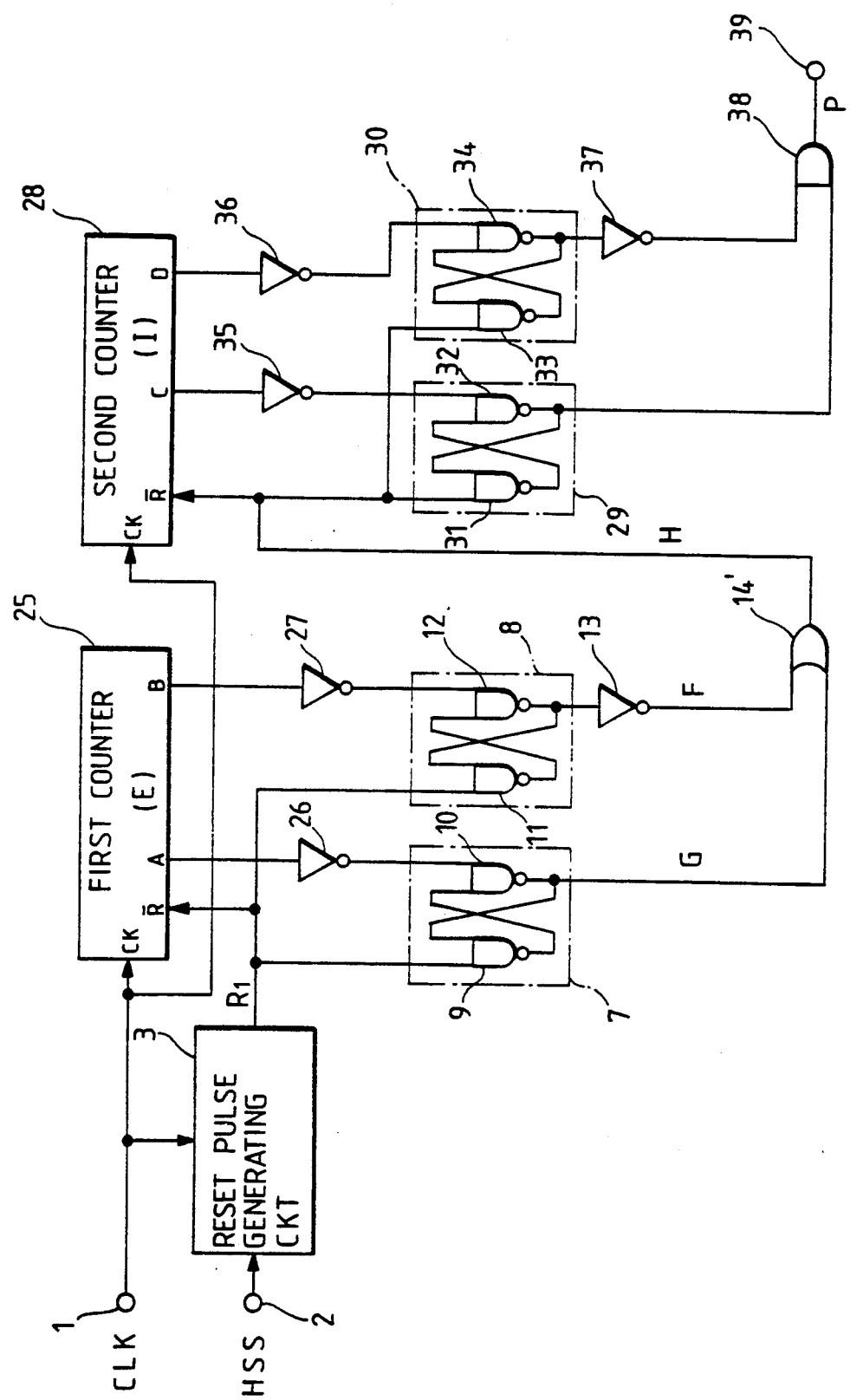
FIG. 5 is a block diagram showing a circuit arrangement of a pilot burst gate pulse generating system according to a second embodiment of this invention.
Figure 6:
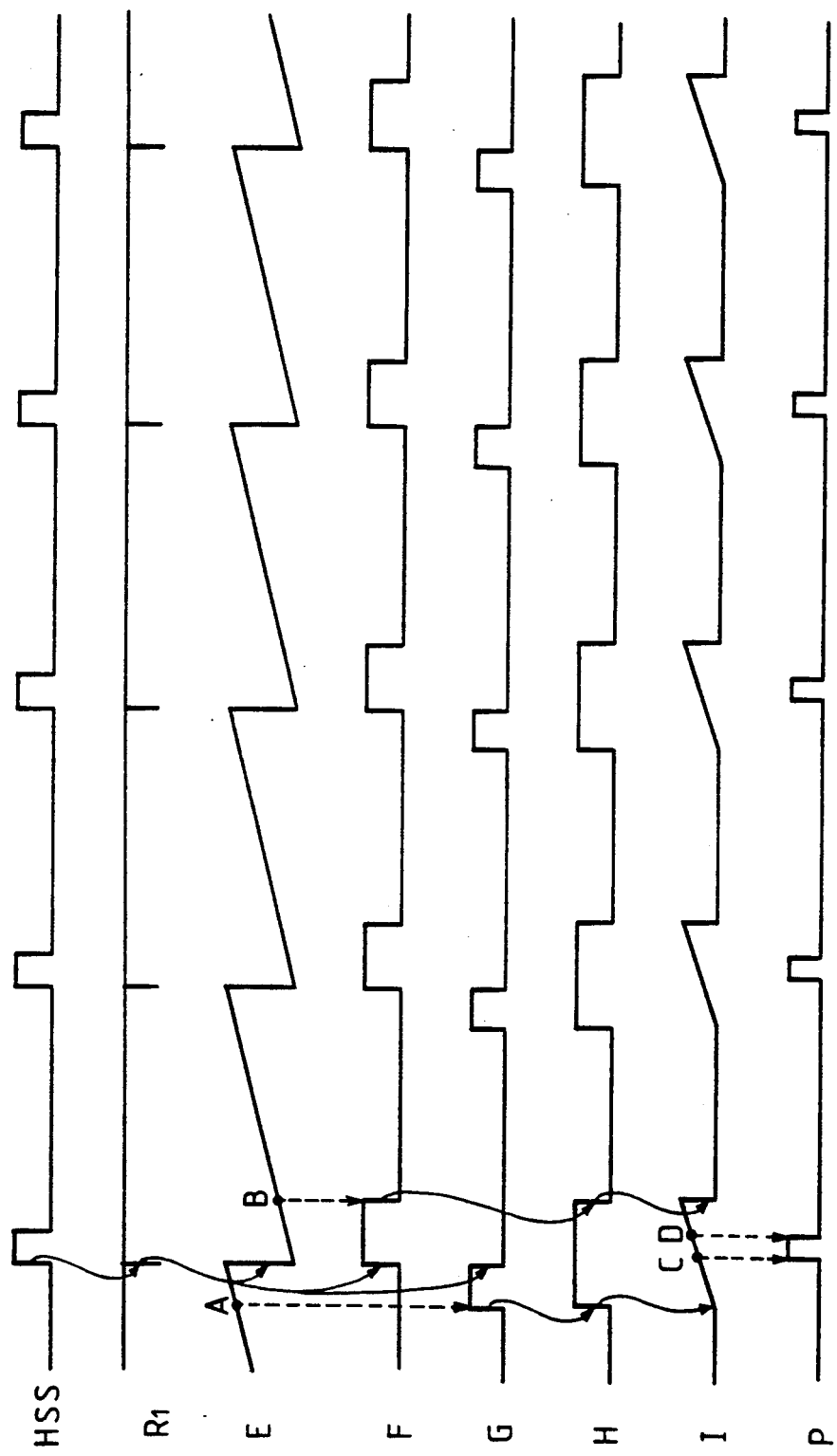
FIG. 6 is a timing chart showing waveforms at portions of the pilot burst gate pulse generating system showin FIG. 3.

A second embodiment of this invention will be described hereinbelow with reference to FIGS. 5 and 6. In FIG. 5, a pilot burst gate pulse generating system of this embodiment similarly includes a first input terminal 1 to receive a clock signal CLK and further includes a second input terminal 2 to receive a horizontal synchronizing signal HSS of a composite synchronizing signal. A reset pulse generating circuit 3, being responsive to the clock signal CLK from the first input terminal 1 and the horizontal synchronizing signal HSS from the second input terminal 2, is triggered in response to the leading edge (active edge) of the horizontal synchronizing signal HSS and generates a reset pulse R1 whose duration corresponds to one or two repetition periods of the clock signal CLK. The reset pulse R1 is supplied as a reset signal to one input terminal of a first latch circuit 7 comprising cross-coupled NAND gates 9 and 10 and further to one input terminal of a second latch circuit 8 comprising cross-coupled NAND gates 11 and 12. The reset pulse R1 is also supplied to a reset terminal $\overline{R}$ of a first counter 25 which is in turn reset by the reset pulse R1 and starts the counting operation in accordance with the clock signal CLK from the first input terminal 1 as illustrated at E in FIG. 6. When reaching a first count value A and then reaching a second count value B, the first counter 25 generates set pulses through its output terminals A and B. The set pulse from the output terminal A is supplied through an inverter 26 to the other input terminal of the first latch circuit 7 and the set pulse from the output terminal B is supplied through another inverter 27 to the other input terminal of the second latch circuit 8. In response to the supply of the set pulses from the first counter 25, the first latch circuit 7 outputs, through its output terminal, pulses each entering into the high-level state when reaching the first count value A and entering into the low-level state coincidently with the reset pulse R1, as illustrated at G in FIG. 6. On the other hand, the output signal of the second latch circuit 8 is led to an inverter 13 which in turn, outputs pulses each entering into the high-level state in synchronism with the reset pulse R1 from the reset pulse generating circuit 3 and entering into the low-level state in response to the count value of the first counter 25 reaching the second count value B, as illustrated at F in FIG. 6. These pulses F and G are supplied to input terminals of an OR gate 14', respectively, thereby obtaining pulses as illustrated at H in FIG. 6. Here, as obvious from FIG. 6, the first counter 25 reaches the first count value A previous to the horizontal synchronizing signal HSS and reaches the second count value B fater the generation of the horizontal synchronising signal HSS, whereby it is possible to set the duration of the pulse H so as to sufficiently cover the horizontal synchronizing signal HSS.

The pulse H is supplied to a reset terminal $\overline{R}$ of a second counter 28 and further to one input terminals of third and fourth latch circuits 29 and 30. Similarly, the third latch circuit 29 is composed of two NAND gates 31 and 32 cross-coupled to each other and the fourth latch circuit 30 is composed of two NAND gates 33 and 34 cross-coupled to each other. The second counter 28, as illustrated at I in FIG. 6, is reset-released in response to the leading edge of the pulse H and reset in response to the trailing edge thereof. Meanwhile, the second counter 28 performs the counting operation in accordance with the clock signal CLK from the first input terminal 1. As obvious from FIG. 6, the reset-releasing of the second counter 28 is coincident in timing with the leading edge of the pulse H, and the leading edge of the pulse H is determined in accordance with the first count value A of the first counter 25. Thus, the second counter 28 continuously counts values after the first count value due to the first counter 25. That is, after being reset by the trailing edge of the pulse H, the second counter 28 takes the reset state until it is reset-released by the leading edge of the next pulse H. Accordingly, if adequately setting third and fourth count values C and D to be counted by the second counter 28, the third and fourth latch circuits 29 and 30 are respectively set when the second counter 28 counts the third and fourth count values C and D so as to output a pulse through its output terminal C and an inverter 35 to the other input terminal of the third latch circuit 29 and a pulse through its output terminal D and an inverter 36 to the other input terminal of the fourth latch circuit 30. The output pulse of the third latch circuit 29 is supplied to one input terminal of an AND gate 38 and the output pulse of the fourth latch circuit 30 is supplied through an inverter 37 to the other input terminal of the AND gate 38, whereby the AND gate 38 outputs through its output terminal 39 a pilot burst gate pulse P depending upon the third and fourth count values C and D.

Similarly, in this embodiment, the pilot burst gate pulse P is dependent upon the count values of the first and second counters 25 and 28 which start the counting operation from the leading edge of the horizontal synchronizing signal before 1 H period. Thus, if adequately determining the third and fourth count values of the second counter 28, it is possible to generate an accurate pilot burst gate pulse P at a timing slightly delayed by 0.8 μsec (for example) from the leading edge of the aiming (next coming) horizontal synchronizing signal. In addition, according to this embodiment, the first counter 25 performs the counting operation with a period corresponding to 1 H period and the second counter 28 effects the counting operation with a period shorter than 1 H period. As a result, as compared with the above-described first embodiment in which the counting operation is made with a period corresponding to 2 H periods, it is possible to reduce the step number of the counter, thereby allowing circuit-scale-reduction to facilitate circuit integration.

Figure 7:
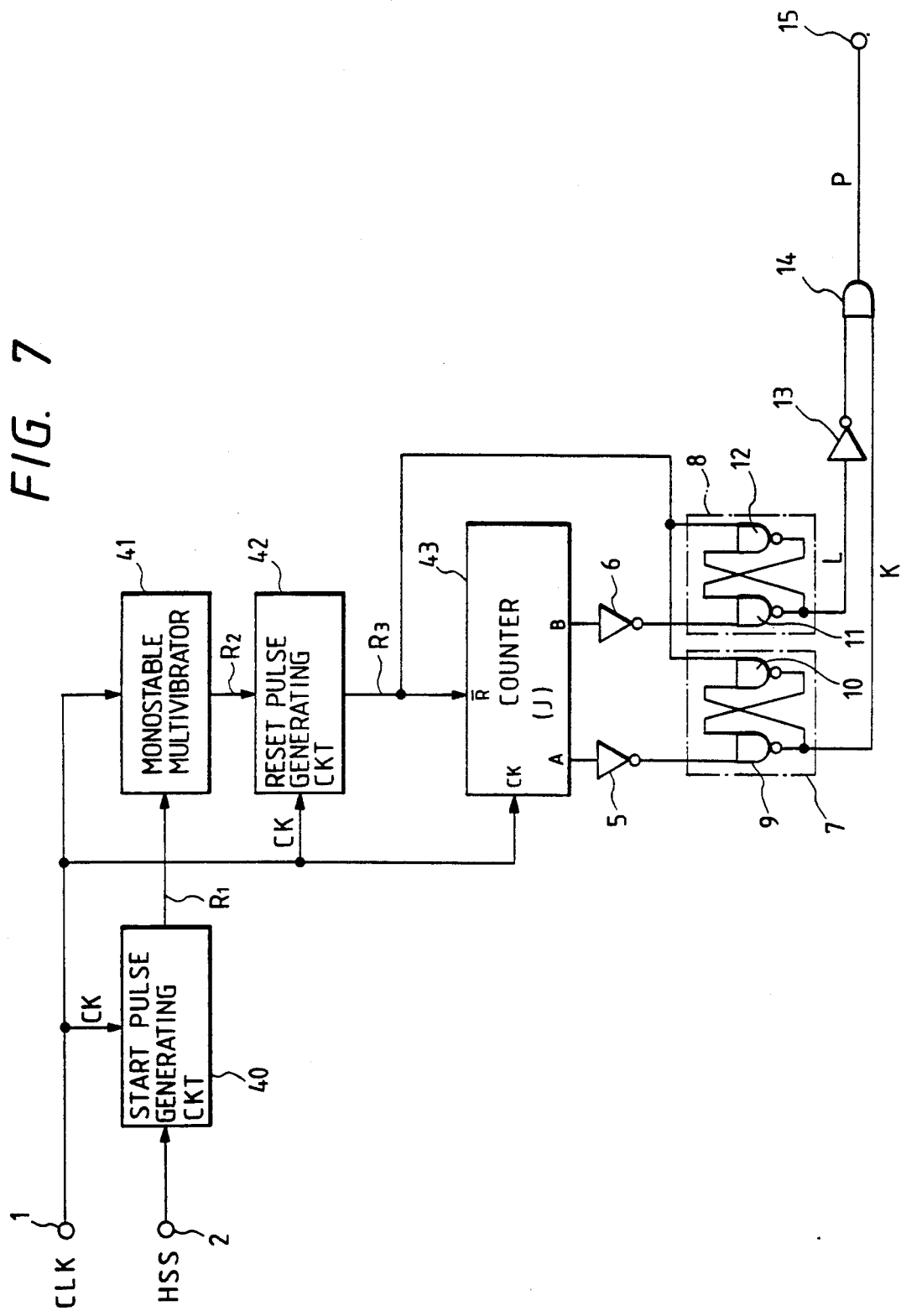
FIG. 7 is a block diagram showing a circuit arrangement of a pilot burst gate pulse generating system according to a third embodiment of this invention; and F'G. 8 is a timing chart showing waveforms at portions of the pilot burst gate pulse generating system in FIG. 7.
Figure 8:
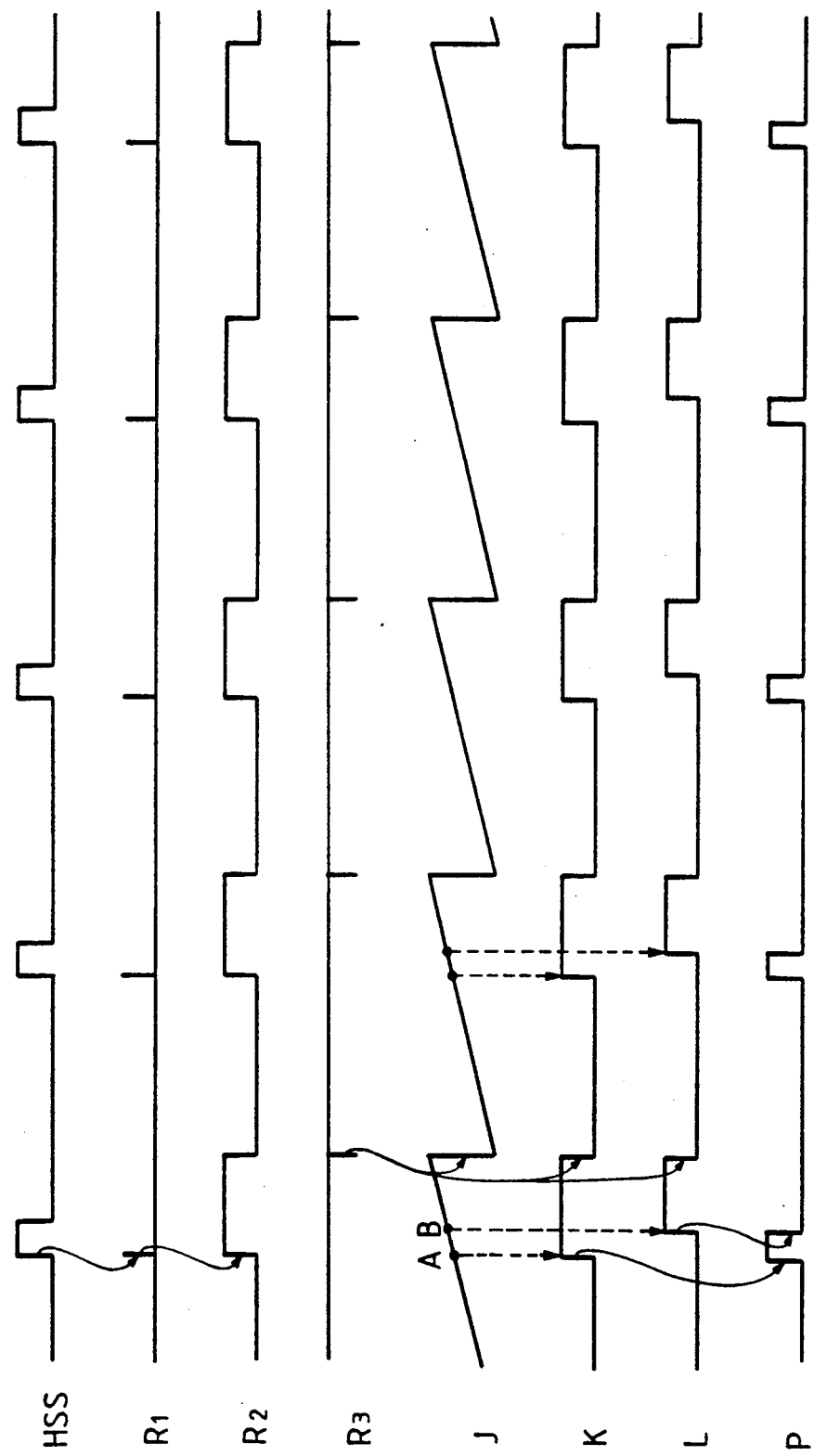

A further description will be made hereinbelow in terms of a pilot burst gate pulse generating system according to a third embodiment of the present invention with reference to FIGS. 7 and 8. In FIG. 7, the pilot burst gate pulse generating system of this embodiment similarly includes a first input terminal 1 for receiving a clock signal CLK and a second input terminal 2 for receiving a horizontal synchronizing signal HSS. A start pulse generating circuit 40, being responsive to the clock signal CLK from the first input terminal 1 and the horizontal synchronizing signal HSS from the second input terminal 2, is triggered in response to the horizontal synchronizing signal HSS so as to generate a start pulse R1 whose duration approximately corresponds to one or two periods of the clock signal CLK. The generated start pulse R1 is supplied to a digital monostable multivibrator 41, operating as a counter, which is arranged to be triggered by the start pulse R1 from the start pulse generating circuit 40 and outputs, in accordance with the clock signal CLK from the first input terminal 1, pulses R2 each having a predetermined duration shorter than 1 H period as illustrated in FIG. 8. While the output (pulse R2) of the monostable multivibrator 41 returns to the low-level state until generation of the next horizontal synchronizing signal HSS, it is supplied to a reset pulse generating circuit 42 so as to reset the reset pulse generating circuit 42 when returning the low-level state. After being reset by the output pulse R2 of the digital monostable multivibrator 41, the reset pulse generating circuit 42 generates, in accordance with the clock signal CLK from the first input terminal 1, a reset pulse R3 which has a duration approximately corresponding to one or two periods of the clock signal CLK. This reset pulse R3 is supplied to a reset terminal of a counter 43 which in turn, starts the counting operation in accordance with the clock signal CLK from the first input terminal 1 after being set by the reset pulse R3 as illustrated at J in FIG. 8. In response to counting first and second values A and B, the counter 43 generates, through its output terminals A and B, set pulses which are supplied through inverters 5 and 6 to one input terminals of first and second latch circuits 7 and 8, respectively. As well as in the above-described embodiments, the first latch circuit 7 is composed of two NAND gates 9 and 10 cross-coupled to each other and the second latch circuit 8 is composed of two NAND gates 11 and 12 cross-coupled to each other. To the other input terminals of the first and second latch circuits 7 and 8, the reset pulse R3 from the reset pulse generating circuit 42 is supplied, whereby at the output terminal of the first latch circuit 7 there is developed a pulse K which rises at a timing corresponding to the first count value A of the counter 43 and falls in synchronism with the reset pulse R3. On the other hand, at the output terminal of the second latch circuit 8 there is developed a pulse L which rises at a timing corresponding to the second count value B of the counter 43 and falls in synchronism with the reset pulse R3. The output pulse K is supplied to one input terminal of an AND gate 14 and the output pulse L is supplied through an inverter 13 to the other input terminal of the AND gate 14, whereby at the output terminal 15 of the AND gate 14 there is developed a pilot burst gate pulse P whose duration depends upon the first and second count values A and B of the counter 43.

Similarly, in this embodiment, the counter 43 starts the counting operation with respect to the leading edge of the horizontal synchronizing signal HSS previous to 1 H period. More specifically, the counter 43 is reset at a timing advanced by a time depending on the digital monostable multivibrator 41 with respect to the leading edge of the horizontal synchronizing signal HSS and starts the counting operation at the same timing. Thus, if adequately setting the first and second count values A and B of the counter 43, a pilot burst gate pulse P can be produced at a timing delayed by an extremely short time (for example, 0.8 μsec) from the leading edge of the horizontal synchronizing signal HSS. In addition, according to this embodiment, the necessary function can be realized with only one counter 43, and since the counter 43 repeatedly performs the counting operation with a period corresponding to 1 H period, it is possible to reduce the step number of the counter. Furthermore, taking into account the fact that the circuit-scales of the start pulse generating circuit 40 and the digital monostable multivibrator 41 are small, it is possible to reduce the entire circuit scale of the system so as to be suitable for fabricating it into a semiconductor substrate as integrated circuit.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention. For example, it is also appropriate to construct the pilot burst gate pulse generating systems by partically or entirely using microcomputers.

What is claimed is:

1. In a signal processing system for a video cassette recorder, the improvement comprising:
   input means for inputting a sequence of horizontal synchronizing signals successively generated in correspondence with horizontal scanning periods of a composite image signal,
   burst gate pulse generating means connected to receive said horizontal synchronizing signals for producing burst gate pulses,
   said burst gate pulse generating means being responsive to a first horizontal synchronizing signal for generating said burst gate pulse at a timing delayed by a predetermined time period from a leading edge of a second horizontal synchronizing signal following said first horizontal synchronizing signal.

2. An improved signal processing system as claimed in claim 1, wherein said burst gate pulse generating means includes:
   first and second counter means for counting a clock signal, said first and second counter means arranged to count said clock signal with a period corresponding to twice the horizontal scanning period of said composite image signal so as to alternately generate output pulse signals when reaching respective predetermined count values,
   reset means for alternately resetting said first and second counter means in synchronism with said horizontal synchronizing signals, and
   means responsive to the output pulse signals from said first and second counter means so as to generate said burst gate pulses.

3. An improved signal processing system as claimed in claim 1, wherein said burst gate pulse generating means includes:
   first counter means for counting a clock signal, said first counter means arranged to count first and second count values of said clock signal during respective first and second count periods each corresponding to one horizontal scanning period of said composite image signal and for producing a first output pulse signal when reaching said first count value in said first count period and for producing a second output pulse signal when reaching said second count value in said second count period,
   second counter means for counting said clock signal, said second counter means arranged to count third and fourth count values of said clock signal in response to said first counter means and to generate count signals indicative of said third and fourth count values, said second counter means connected to start counting in response to said first output pulse signal from said first counter means and to stop counting in response to said second output pulse signal from said first counter means and continue in a stopped counting mode of operation until said first counter means generates the next first output pulse signal in response to reaching the next first count value in the second count period, and
   means coupled to said second counter means so as to generate a burst gate pulse in accordance with said count signals generated by said second counter means when said second counter means counts said third and fourth count values in each count period.

4. An improved signal processing system as claimed in claim 1, wherein said burst gate pulse generating means includes:
   first means for generating, in response to the horizontal synchronizing signals, a pulse having a duration is shorter than one horizontal scanning period of said composite image signal,
   counter means coupled to said first means and connected to be reset in response to a trailing edge of said pulse from said first means to start counting operation with a count period corresponding to one horizontal period, said counter means generating a count signal upon reaching a predetermined count value, and
   second means coupled to said counter means for generating a burst gate pulse in accordance with count signals generated by said counter means upon reaching said predetermined count value at every count period.

5. An improved signal processing system as claimed in claim 1, wherein said burst gate pulse generating means comprises:
   counter means for counting a predetermined number of clock signals corresponding to said predetermined time period, and
   output decoder means connected to an output of said counter means for generating a pilot burst gate pulse for checking whether the composite image signal is an S-VHS signal or a standard VHS signal, said pilot burst gate pulse delayed by said predetermined time period from the leading edge of said second horizontal synchronizing signal.

6. In a signal processing system for a video cassette recorder, the improvement comprising:
   input means for inputting a sequence of horizontal synchronizing signals successively generated in correspondence with horizontal scanning periods of a composite image signal,
   burst gate pulse generating means connected to receive said horizontal synchronizing signals for producing burst gate pulses,
   said burst gate pulse generating means being responsive to a leading edge of a first horizontal synchronizing signal for generating said burst gate pulse at a timing delayed by a predetermined time period from a leading edge of a second horizontal synchronizing signal following said first horizontal synchronizing signal.

7. An improved signal processing system as recited in claim 6, wherein said burst gate pulse generating means is triggered responsive to said leading edge of said first horizontal synchronizing signal and outputs said burst gate pulse in response to said leading edge of said second horizontal synchronizing signal.

8. An improved signal processing system as recited in claim 6, wherein said burst gate pulse generating means includes first means responsive to said leading edge of said first horizontal synchronizing signal and second means responsive to said leading edge of said second horizontal synchronizing signal, and
   wherein said burst gate pulse generating means is triggered by said first means and outputs said burst gate pulse in response to said second means.

* * * * *